United States Patent
Dalmazzone et al.

(10) Patent No.: US 10,774,709 B2
(45) Date of Patent: Sep. 15, 2020

(54) FLUID FOR PURIFYING HEAT ENGINES AND METHODS FOR PREPARING SAID FLUIDS BY EMULSIFICATION

(71) Applicant: IFP Energies nouvelles, Rueil-Malmaison (FR)

(72) Inventors: Christine Dalmazzone, Viroflay (FR); Stephane Raux, Orlienas (FR)

(73) Assignee: FP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/775,461

(22) PCT Filed: Oct. 20, 2016

(86) PCT No.: PCT/EP2016/075196
§ 371 (c)(1),
(2) Date: May 11, 2018

(87) PCT Pub. No.: WO2017/080777
PCT Pub. Date: May 18, 2017

(65) Prior Publication Data
US 2018/0371974 A1    Dec. 27, 2018

(30) Foreign Application Priority Data
Nov. 13, 2015 (FR) .................... 15 60908

(51) Int. Cl.
| | |
|---|---|
| F01N 3/029 | (2006.01) |
| F01N 3/20 | (2006.01) |
| B01D 53/90 | (2006.01) |
| F01N 3/28 | (2006.01) |
| B01D 46/00 | (2006.01) |
| B01D 53/94 | (2006.01) |

(52) U.S. Cl.
CPC ....... *F01N 3/0293* (2013.01); *B01D 46/0061* (2013.01); *B01D 53/90* (2013.01); *B01D 53/9418* (2013.01); *F01N 3/2066* (2013.01); *F01N 3/2896* (2013.01); *B01D 53/9477* (2013.01); *B01D 2251/206* (2013.01); *B01D 2251/2062* (2013.01); *B01D 2251/2065* (2013.01); *B01D 2251/2067* (2013.01); *B01D 2251/21* (2013.01); *B01D 2251/302* (2013.01); *B01D 2251/304* (2013.01); *B01D 2251/404* (2013.01); *B01D 2251/80* (2013.01); *B01D 2255/906* (2013.01); *B01D 2258/012* (2013.01); *B01D 2279/30* (2013.01); *F01N 2610/01* (2013.01); *F01N 2610/02* (2013.01); *F01N 2610/03* (2013.01); *Y02T 10/24* (2013.01)

(58) Field of Classification Search
None
See application file for complete search history.

(56) References Cited

U.S. PATENT DOCUMENTS

| | | | | |
|---|---|---|---|---|
| 5,283,001 | A * | 2/1994 | Gregoli | B01F 3/0807 137/13 |
| 5,404,841 | A * | 4/1995 | Valentine | C10L 10/02 123/1 A |
| 5,535,708 | A | 7/1996 | Valentine | |
| 5,809,774 | A | 9/1998 | Peter-Hoblyn et al. | |
| 5,874,294 | A * | 2/1999 | Valentine | C10G 32/00 435/262 |
| 6,003,303 | A * | 12/1999 | Peter-Hoblyn | F01N 3/037 60/274 |
| 7,435,707 | B2 * | 10/2008 | Langer | C10M 171/00 508/154 |
| 8,999,277 | B2 * | 4/2015 | Ayyappan | F01N 3/2066 252/182.12 |
| 9,957,454 | B2 * | 5/2018 | Morris | C10L 5/32 |
| 2003/0182848 | A1 * | 10/2003 | Collier | C07C 51/414 44/358 |
| 2003/0226312 | A1 * | 12/2003 | Roos | F02M 25/0228 44/280 |
| 2005/0039382 | A1 | 2/2005 | Blanchard et al. | |
| 2006/0162237 | A1 * | 7/2006 | Mullay | B01F 17/0085 44/301 |
| 2008/0250703 | A1 * | 10/2008 | Krogh | C10L 1/10 44/384 |
| 2013/0064744 | A1 | 3/2013 | Yacoub | |
| 2013/0137608 | A1 * | 5/2013 | Chang | C09K 8/52 507/90 |
| 2014/0013659 | A1 | 1/2014 | D'Alencon et al. | |
| 2015/0101310 | A1 * | 4/2015 | Kowalkowski | F01N 3/0885 60/274 |

FOREIGN PATENT DOCUMENTS

| | | |
|---|---|---|
| DE | 10022763 A1 | 11/2001 |
| FR | 1462228 A | 4/1966 |
| FR | 2833862 A1 | 6/2003 |
| FR | 2947004 A1 | 12/2010 |
| FR | 2969653 B1 | 2/2013 |
| WO | 01/36570 A1 | 5/2001 |
| WO | 2005002902 | * 7/2003 |

OTHER PUBLICATIONS

International Search Report for PCT/EP2016/075196, dated Jan. 31, 2017; English translation submitted herewith (8 pgs.).

* cited by examiner

*Primary Examiner* — Sheng H Davis
(74) *Attorney, Agent, or Firm* — Fitch, Even, Tabin & Flannery, LLP

(57) ABSTRACT

The present invention describes a fluid which is suitable for the decontamination of heat engines which can carry out, at the same time, both the catalytic reduction of oxides of nitrogen (NOx) contained in exhaust gases and assist in the regeneration of the particulate filter (PF). The invention also describes several embodiments of said fluid consisting of producing an oil-in-water type emulsion.

16 Claims, No Drawings

FLUID FOR PURIFYING HEAT ENGINES AND METHODS FOR PREPARING SAID FLUIDS BY EMULSIFICATION

CROSS-REFERENCE TO RELATED APPLICATIONS

This application is a U.S. national phase application filed under 35 U.S.C. § 371 of International Application No. PCT/EP2016/075196, filed Oct. 20, 2016, designating the United States, which claims priority from French Patent Application No. 15/60.908, filed Nov. 13, 2015, which are hereby incorporated herein by reference in their entirety.

FIELD OF THE INVENTION

The present invention describes a single fluid for automobile decontamination, enabling two distinct operations to be carried out: selective catalytic reduction of NOx using Selective Catalytic Reduction technology, usually given the acronym SCR, as well as with assisting in the regeneration of the particulate filter (PF), this aid to regeneration possibly manifesting itself either by promoting the continuous regeneration of the particulate filter, or by accelerating the combustion of soot during the active regeneration phases of the PF, or by a combination of these two advantages. The fluid in accordance with the invention is homogeneous in appearance and has the characteristics of stability over time, or upon variations in the temperature or pH. The present invention describes various embodiments for the production of the fluid as well as the embodiment for use of this fluid.

PRIOR ART

Various technologies have been applied in order to reduce the harmful emissions of exhaust gases which are emitted by diesel heat engines, in particular oxides of nitrogen (NOx) and particles.

One example of an exhaust line integrating the system for the treatment of NOx by selective catalytic reduction (denoted SCR, the abbreviation for Selective Catalytic Reduction), and the particulate filter (abbreviated to PF) is given in the patent FR 2 947 004. These two decontamination systems may also be combined into a single module which is known by the term SCR on filter or SCRF or SDPF or SCRoF.

We have not found a fluid in the literature which can be used to combine the functions of reducing oxides of nitrogen and assisting in the regeneration of trapped particles of soot.

AdBlue® (or AUS32 or DEF or ARLA32) is a 32.5% by weight solution of urea in pure water which is used for the selective reduction of oxides of nitrogen in the context of SCR technology for road and non-road applications.

Eolys Powerflex®, Infineum F7995® or Tenneco Walker® are additives constituted by an organic colloidal dispersion of metallic particles in a mixture of hydrocarbons (described for Eolys in the texts FR 2 833 862 and FR 2 969 653 B1) which are intended to assist in the regeneration of the PF and enable the soot to be oxidized at a lower temperature.

The general concept of mutualisation of these decontamination functions formed the subject matter of the French patent application 14/62.228 filed at the end of 2014. The present application may be considered to be an improvement of the application 14/62.228.

BRIEF DESCRIPTION OF THE INVENTION

The present invention describes a fluid for the decontamination of heat engines, in particular diesel engines, in order to be able to carry out the selective catalytic reduction of oxides of nitrogen contained in exhaust gases (the function termed SCR) at the same time as assisting in the regeneration of the particulate filter (PF) by catalytic combustion of particles of soot deposited in the particulate filter (the function termed assistance in the regeneration of PF), this regeneration assistance possibly being manifested either by promoting the continuous regeneration of the particulate filter, or by accelerating the combustion of soot during the active PF regeneration phases, or by a combination of these two advantages.

The use of a catalyst for the oxidation of soot differs from the prior art cited above in that it is injected directly into the exhaust and thus does not pass through the combustion chamber of the engine.

Injection of fluid in accordance with the invention is triggered by the engine computer in order to respond to a need to provide the necessary quantity of ammonia over the SCR catalyst in order to carry out efficient reduction of the NOx.

The injections are carried out in a regular manner in accordance with a period which is typically in the range from a few milliseconds to a few tens of seconds, depending on the operational conditions of the engine, which means that homogeneous mixing of the catalyst with the soot can be promoted and intimate contact between the soot and the catalyst can be guaranteed.

Finally, the fact of injecting the fluid in accordance with the invention means that either the phenomenon of continuous regeneration of the particulate filter is promoted, and thus the active PF regeneration periods can be spaced apart, or that combustion of the soot during the active PF regeneration phases is accelerated, meaning that fuel consumption in respect of this phase can be limited and/or the chances of burning a large mass of soot when the temperature and gas composition conditions in the exhaust are favourable to this active regeneration are maximized, or a combination of these two advantages.

The fluid in accordance with the invention is produced from a stable mixture of two products which are not mutually miscible, namely on the one hand, an aqueous solution of at least one reducing compound or precursor of a reducing agent such as urea, and on the other hand a dispersion of one or more metal oxides in a hydrocarbon or a mixture of hydrocarbons.

In the remainder of the text, in order to designate the component composed of one or more metal oxides dispersed in a hydrocarbon or a mixture of hydrocarbons, for the purposes of brevity we shall abbreviate this to a "dispersion of metal oxides". The plural in the expression "metal oxides" means that there could be one or more metal oxides as a mixture.

The fluid in accordance with the invention is constituted by a solution with a homogeneous appearance of at least one reducing compound or precursor of a reducing agent, a dispersion of metal oxides, and a surfactant or a mixture of surfactants which can be used to produce and stabilize a direct emulsion of the oil-in-water type. The metal or metals composing the metal oxide or oxides are selected from the following list of metals: Fe, Cu, Ni, Co, Zn, Mn, Ti, V, Sr, Pt, Ce, Ca, Li, Na, Nb.

Preferably, the metals are selected from the following list: Fe, Ce, Cu, Sr.

In accordance with a preferred variation of the invention, the dispersion of metal oxides is in the form of a dispersion of one or more oxides of iron in a mixture of hydrocarbons of the Eolys Powerflex® type.

Preferably, the reducing compound or precursor of a reducing agent in solution in pure water is selected from urea, ammonia, formamide, and ammonium salts, in particular ammonium formate, ammonium carbamate, and guanidine salts, in particular guanidinium formate.

Preferably, the concentration of metal oxide or metal oxides in the emulsion produced using the surfactant or surfactants with the reducing compound or precursor of a reducing agent is in the range 10 to 10000 ppm, preferably in the range 10 to 5000 ppm, and more preferably in the range 10 to 2000 ppm.

In order to produce the emulsion, any type of surfactant, namely anionic, cationic or nonionic, may be used, preferably soluble in water and with an HLB (hydrophilic/lipophilic balance) in the range 7 to 16.

The HLB is more specifically adapted to nonionic compounds and expresses the relationship between the hydrophilic nature and the lipophilic nature of the surfactant molecules.

The HLB classification is established by the ratio between the fatty chain and the group which is soluble in water, and varies between 0 (completely lipophilic) and 20 (completely hydrophilic).

Preferably, nonionic surfactants are used.

Preferably, the surfactants are selected from any commercially available formulation or any mixture produced from chemical families such as sorbitan esters which may or may not be ethoxylated (such as Tween® and Span® from CRODA), ethylene oxide (EO)/propylene oxide (PO) block copolymers (such as Synperonic® PEL from CRODA), ethoxylated fatty acids or alcohols (such as Simulsol® OX from SEPPIC or Rhodasurf® from Solvay), ethoxylated fatty acid esters (such as Atlas® from CRODA), ethoxylated octylphenols (such as TRITON® X from Union Carbide), alkylpolyglucosides or APG (such as Simulsol SL® from SEPPIC and Plantacare 2000 UP® from BASF), alone or as a mixture.

In accordance with another variation of the invention, the reducing compound or compounds or the precursor or precursors of a reducing agent is urea, 32.5±0.7% by weight in solution in demineralized water or pure water and complying with the specifications of the standard ISO 22241.

In accordance with a highly preferred variation of the present invention, the solution containing the reducing compound or compounds or the precursor or precursors of a reducing agent is prepared from a product which complies with the specifications of the standard ISO 22241, for example the commercial products AdBlue®, DEF, AUS32 or ARLA32.

In accordance with another preferred variation of the present invention, the solution containing the reducing compound or compounds or the precursor or precursors of a reducing agent is prepared from a product having the physical and chemical characteristics of the standard ISO 22241-1, for example the commercial product Diaxol®.

Hereinbelow, the term Adblue® will be used to designate any of the following products: Adblue®, DEF, AUS32, ARLA32 or Diaxol®.

The fluid for the decontamination of heat engines in accordance with the invention is preferably stable at a temperature in the range −11° C. to +60° C.

Finally, the fluid for the decontamination of heat engines has good stability as regards light.

The present invention also pertains to various embodiments of the fluid for the decontamination of heat engines.

Thus, in accordance with a first embodiment of the process, a surfactant is added to a solution of at least one reducing compound or precursor of a reducing agent, followed by addition of the dispersion of metal oxides which is emulsified by means of an appropriate mixing system, then diluting by adding the solution of at least one reducing compound or precursor of a reducing agent in order to obtain the desired metal oxides content.

In accordance with a second process for the production of a fluid for the decontamination of heat engines, a surfactant is added to a solution of at least one reducing compound or precursor of a reducing agent, followed by addition of the dispersion of metal oxides which is emulsified by means of an appropriate mixing system in order to directly obtain the desired metal oxides content.

The present invention also concerns the use of the decontamination fluid in an internal combustion engine of the diesel type, the injection of said fluid being carried out upstream of the SCR and PF systems for the treatment of exhaust gases (or of the single treatment system when these are combined into a single module) and being operated in a regular manner as a function of the operational conditions of the heat engine.

DETAILED DESCRIPTION OF THE INVENTION

The invention consists of a multi-functional fluid for the decontamination of exhaust gases emitted by an internal combustion engine. The multi-functional fluid in accordance with the invention promotes either the continuous regeneration of the particulate filter or the combustion of soot during the active regeneration phases of the PF, or can be used to combine these two advantages.

This fluid is essentially composed of an emulsion between a dispersion of one or more metal oxides in a hydrocarbon or a mixture of hydrocarbons on the one hand, and an aqueous solution containing at least one reducing agent or at least one precursor of a reducing agent for NOx on the other hand.

Said emulsion is made possible by the presence of one or more surfactants.

The fluid obtained in this manner can be used to concomitantly carry out two of the functions necessary to the decontamination of heat engines, more particularly the diesel engine, namely the selective catalytic reduction of NOx and assistance with the oxidation of particles trapped in the PF by catalytic combustion.

Producing the fluid in accordance with the invention results in an emulsion which has the characteristics of stability over time, with this being up to a temperature of 60° C.

The fluid in accordance with the invention may be produced from a commercially available solution of AdBlue® which complies with the ISO 22241 specifications.

One important advantage of the fluid in accordance with the invention resides in the fact that it combines the two functions of engine emission decontamination in a single fluid.

One of the other advantages of the invention is that it does not substantially modify the properties of density, viscosity and storage of the solution of AdBlue®, which in practice means that it is not necessary to modify the system for injecting AdBlue® into the engine in order to benefit from the advantages of the invention.

The principle of the invention is to combine, in a single fluid, on the one hand a reducing compound or precursor of a reducing agent such as urea, which will act as a reducing agent or as a precursor of a reducing agent such as ammonia, and on the other hand a dispersion of metal oxides which, in the exhaust line under the effect of temperature and the residual oxygen of the exhaust gases, will bring the soot into contact with a compound which reduces its oxidation temperature, which has the effect of assisting continuous oxidation of the filtered soot and reducing the energy cost of active regeneration of the filter when this is necessary. Another effect of the metal oxides is to increase the rate of oxidation of the soot by a catalytic process and thus to regenerate the PF in a shorter time.

Various ways of producing the fluid in accordance with the invention exist, corresponding to several variations.

The simplest consists of modifying a commercial solution of AdBlue® or of producing a solution of urea which complies with ISO 22241 specifications, or in fact of using another reducing compound such as ammonia, for example.

It is possible to produce stable emulsions with different nonionic surfactants and dispersions which are capable of providing a sufficient concentration of at least one metal oxide promoting the oxidation of soot. The remainder of the description details several embodiments of the fluid in accordance with the invention.

The chemistry of surfactants is very rich and has many applications in fields as disparate as the cosmetics industry, pharmaceuticals industry, road industry and detergent industry, for example.

There are many surfactants. They may be divided into cationic, anionic and nonionic surfactants.

Emulsification (i.e. the process of dispersion of oil in water) may be carried out using any appropriate means which is known to the person skilled in the art with the aid of any dynamic mixer, batchwise or continuously.

Examples of equipment of this type are rotor-stator mixers (for example those sold by VMI Rayneri under the trademark Ultramix®), colloidal mills, high pressure homogenizers or in fact ultrasound devices.

Equipment constituted by a rotary agitator comprising one or more movable parts fixed on a shaft which has a power density of the order of $10^3$ to $10^9 W/m^3$ is particularly suitable.

The metal oxides content in the final composition of the fluid in accordance with the invention may be in the range 1 to 10000 ppm, preferably in the range 1 to 5000 ppm, and more preferably in the range 10 to 2000 ppm.

Reducing the metal content can prevent the accumulation of metallic ash in the PF.

The fluid as described in the present invention is stable over time. The action of light does not modify the stability of the solution and the crystallization conditions and the stability of the urea are not affected.

Prolonged exposure to temperatures of +60° C. also do not affect this stability.

Thawing of the solution after freezing to the core can recover the properties of the solution before freezing (no decanting or coalescence). Finally, in the case in which the fluid is prepared from a solution of urea or AdBlue®, the quantity of the agents added to the solution remains low and can comply with the normalized concentration of urea of 32.5±0.7%.

The inventive merit of the invention resides in the judicious selection of the components of the formulation. It is not obvious to produce a stable emulsion between a dispersion of metal oxides in one or more hydrocarbons on the one hand and an aqueous solution of urea on the other hand. In fact, naturally, these two phases, one aqueous and the other oily, are not miscible.

EXAMPLES IN ACCORDANCE WITH THE INVENTION

The examples below describe four embodiments for the preparation of the fluid in accordance with the invention. These examples do not limit the possibilities of the invention, but are provided by way of illustration.

The fluids may be prepared at ambient temperature or at a temperature of less than 60° C.

When the fluid has two distinct phases, it does not comply with the specifications.

These few cases demonstrate that obtaining a fluid in accordance with the invention is not a systematic occurrence. All of the examples described were produced with a commercially available solution of AdBlue® for the urea solution, and with commercially available Eolys Powerflex® for the dispersion of metal oxides in hydrocarbons.

Examples in Accordance with Embodiment 1

The fluid was produced as follows: 51 g of AdBlue® was introduced into a 150 cm³ glass flask; a mass of 1.5 grams of surfactant was added which was dispersed with the aid of a manual stirrer. Next, 3 g of Eolys Powerflex® was introduced which was dispersed with the aid of a laboratory mixer provided with a blade adapted to forming an emulsion. After stirring for 5 minutes at ambient temperature, the appearance of the fluid was evaluated.

TABLE 1

Process embodiment 1

| Example | AdBlue ® | Eolys Powerflex ® | Surfactant (1.5 g) | Appearance of fluid |
|---|---|---|---|---|
| 1 | 51 g | 3 g | Laurylglucoside | Heterogeneous appearance - two distinct phases |
| 2 | 51 g | 3 g | Decylglucoside | Homogeneous appearance |
| 3 | 51 g | 3 g | Cocoglucoside | Heterogeneous appearance - two distinct phases |

It can be seen that fluid compositions exist which provide emulsions with a homogeneous appearance without any solid deposits, which are then diluted with the necessary quantity of AdBlue® in order to obtain the target concentration of metal oxides in the range 300 to 400 ppm in the example. The appearance of the fluid was evaluated once more. It can be seen that the fluid compositions were still emulsions with a homogeneous appearance with no solid deposits or phase separation.

In Table 1, Examples 1 and 3 are not in accordance with the invention because they resulted in a heterogeneous fluid. Example 2 satisfied the criteria of the invention.

Examples in Accordance with Embodiment 2

The fluid was produced as follows: 100 g of AdBlue® was introduced into a 250 cm³ glass flask; a mass of 1 gram of surfactant was added which was dispersed with the aid of a manual stirrer. Next, 2 g of Eolys Powerflex® was introduced which was dispersed with the aid of a laboratory mixer provided with a blade adapted to the formation of an emulsion. After stirring for 15 minutes at ambient temperature, the appearance of the fluid was evaluated.

TABLE 2

Process embodiment 2

| Example | AdBlue ® | Eolys Powerflex ® | Surfactant (1 g) | Appearance of fluid |
|---|---|---|---|---|
| 4 | 100 g | 2 g | Laurylglucoside (BASF plantacare 1200 UP) | Heterogeneous appearance - two distinct phases |
| 5 | 100 g | 2 g | Decylglucoside (BASF plantacare 2000 UP) | Homogeneous appearance |
| 6 | 100 g | 2 g | Cocoglucoside (BASF plantacare 818 UP) | Heterogeneous appearance - two distinct phases |

It can be seen that fluid compositions exist which provide emulsions with a homogeneous appearance without any solid deposits.

In Table 2, Examples 4 and 6 are not in accordance with the invention because they resulted in a heterogeneous fluid. Example 5 satisfied the criteria of the invention.

Examples Illustrating the Stability of the Fluid as a Function of Temperature

In order to verify that the examples of fluid in accordance with the invention did not modify the crystallization temperature, we placed test tubes containing the fluid compositions in accordance with the invention in a cold bath maintained at −10° C.±1° C. for two hours. We observed that at this temperature, the fluid remained homogeneous in appearance.

TABLE 3

Evaluation of characteristics of different fluids in accordance with the invention at a temperature close to that for the crystallization of AdBlue

| Example | Example tested | Appearance of fluid at −10° C. |
|---|---|---|
| 7 | Example 2 | Homogeneous appearance, liquid |
| 8 | Example 5 | Homogeneous appearance, liquid |

In order to verify that the fluid examples in accordance with the invention remained stable after crystallization due to freezing then thawing, we placed test tubes containing the various fluids in accordance with the invention for two hours in a cold bath maintained at −18° C.±1° C., then we removed them after confirming that the fluids had solidified, in order to return them to ambient temperature over two hours. We observed that the various fluids regained their homogeneous, liquid appearance.

TABLE 4

Influence of freezing/thawing on the stability of various fluids in accordance with the invention

| Example | Example tested | Appearance of fluid after freezing to the core at −18° C. then thawing |
|---|---|---|
| 9 | Example 2 | Homogeneous appearance, liquid |
| 10 | Example 5 | Homogeneous appearance, liquid |

The invention claimed is:

1. A fluid for the decontamination of heat engines in order to be able to carry out, at the same time, both the selective catalytic reduction of oxides of nitrogen contained in exhaust gases as well as assisting in the regeneration of the particulate filter (PF) by catalytic combustion of particles of soot deposited in the particulate filter, the fluid comprising: an oil-in-water emulsion comprising:
   an aqueous solution of at least one reducing compound or precursor of a reducing compound, the aqueous solution of at least one reducing compound or precursor of a reducing compound being a solution of urea, 32.5±0.7% by weight in solution in demineralized water or being a solution of at least one of ammonium formate, ammonium carbamate, and guanidine salts in water,
   a dispersion of metal oxides in a hydrocarbon or a mixture of hydrocarbons, and
   a surfactant or a mixture of surfactants enabling the production and stabilization of a stable oil-in-water type emulsion, the surfactant or mixture of surfactants comprising a nonionic surfactant soluble in water and having an HLB (hydrophilic/lipophilic balance) in the range 7 to 16 selected from any mixture produced from the chemical families sorbitan esters, ethoxylated sorbitan esters, ethylene oxide (EO)/propylene oxide (PO) block copolymers, ethoxylated fatty acids or alcohols, ethoxylated fatty acid esters, ethoxylated octylphenols, alkylpolyglucosides or APG, alone or as a mixture.

2. The fluid for the decontamination of heat engines, as claimed in claim 1, in which the metal oxides, used alone or in combination, are selected from the following list of metals: Fe, Cu, Ni, Co, Zn, Mn, Ti, V, Sr, Pt, Ce, Ca, Li, Na, Nb.

3. The fluid for the decontamination of heat engines as claimed in claim 1, in which the dispersion of metal oxides is in the form of a dispersion of an oxide of iron or a mixture of oxides of iron in a mixture of hydrocarbons of the Eolys Powerflex® type.

4. The fluid for the decontamination of heat engines as claimed in claim 1, in which the reducing compound or precursor of a reducing agent in aqueous solution is selected from urea, ammonia, formamide, and ammonium salts.

5. The fluid for the decontamination of heat engines as claimed in claim 1, in which the concentration of metal ion in the emulsion produced using the surfactant or surfactants with the reducing compound or precursor of a reducing agent is in the range 10 to 10000 ppm.

6. The fluid for the decontamination of heat engines as claimed in claim 1, in which the aqueous solution of at least one reducing compound or precursor of a reducing compound is urea, 32.5±0.7% by weight in solution in demineralized water.

7. The fluid for the decontamination of heat engines as claimed in claim 1, in which the solution of the reducing compound is prepared from the commercially available product AdBlue®.

8. The fluid for the decontamination of heat engines as claimed in claim 1, in which the fluid remains stable at a temperature in the range −11° C. to +60° C.

9. A process for the preparation of fluid for the decontamination of heat engines as claimed in claim 1, in which a surfactant is added to an aqueous solution of at least one reducing compound or precursor of a reducing agent, followed by addition of the dispersion of metal oxides which is emulsified by means of a mixing system, then diluting by adding the aqueous solution of at least one reducing compound or precursor of a reducing agent in order to obtain the desired metal oxides content.

10. Use of the fluid for the decontamination of heat engines as claimed in claim 1, in an internal combustion engine of the diesel type, the injection of said fluid being carried out upstream of the SCR and PF systems for the treatment of exhaust gases and being operated as a function of the operational conditions of the heat engine.

11. The fluid for the decontamination of heat engines, as claimed in claim 1, in which the metal oxides, used alone or in combination, are selected from the following list of metals: Fe, Ce, Cu, Sr.

12. The fluid for the decontamination of heat engines as claimed in claim 1, in which the aqueous solution of at least one reducing compound or precursor of a compound is a solution of at least one of ammonium formate, ammonium carbamate, and guanidine salts in water.

13. The fluid for the decontamination of heat engines as claimed in claim 1, in which the concentration of metal ion in the emulsion produced using the surfactant or surfactants with the reducing compound or precursor of a reducing agent is in the range 10 to 5000 ppm.

14. The fluid for the decontamination of heat engines as claimed in claim 1, in which the concentration of metal ion in the emulsion produced using the surfactant or surfactants with the reducing compound or precursor of a reducing agent is in the range 10 to 2000 ppm.

15. A process for the decontamination of heat engines, comprising injecting the fluid for the decontamination of heat engines as claimed in claim 1 directly into an exhaust system of an internal combustion engine of the diesel type upstream of the SCR and PF systems for the treatment of exhaust gases and being operated as a function of the operational conditions of the heat engine.

16. The fluid for the decontamination of heat engines as claimed in claim 1, in which the aqueous solution of at least one reducing compound or precursor of a compound is a solution of guanidinium formate in water.

* * * * *